Oct. 4, 1966    C. T. DORAN    3,277,365
DEVICE HAVING TWO PAIRS OF SPACED CONDUCTIVE BLOCKS
FOR DETECTING SEGMENTS OF A CONDUCTOR WHICH
ARE BARE OF INSULATION
Filed Nov. 19, 1963

INVENTOR.
C.T. DORAN
BY S. Gundersen
ATTORNEY

United States Patent Office 3,277,365
Patented Oct. 4, 1966

3,277,365
DEVICE HAVING TWO PAIRS OF SPACED CONDUCTIVE BLOCKS FOR DETECTING SEGMENTS OF A CONDUCTOR WHICH ARE BARE OF INSULATION
Charles T. Doran, Buffalo, N.Y., assignor to Western Electric Company, Incorporated, New York, N.Y., a corporation of New York
Filed Nov. 19, 1963, Ser. No. 324,695
1 Claim. (Cl. 324—54)

This invention relates to a bare wire detecting device for detecting those segments of an insulated conductor which are bare of insulation.

In the communications industry, insulated wire of high quality is required. It is essential that defects in such insulated wire be discovered prior to installation thereof. In the manufacture of insulated wire, portions of the wire may be bare in places due to faulty insulating, foreign particles in the insulation, voids, scrapes and cuts, etc.

It is, therefore, an object of this invention to provide facilities for detecting segments of insulated wire having a predetermined length which are bare of insulation.

With this and other objects in view, the instant invention contemplates the utilization of two conductive zones which are insulated and spaced from one another by a predetermined distance. By passing an insulated wire through each conductive zone and by impressing a high D.C. voltage across the two conductive zones, bare portions of the wire which are equal to or longer than the spacing between the conductive zones will complete a circuit between the conductive zones. The resulting flow of current between the conductive zones due to such bare portions of wire is sensed and utilized to indicate the presence of unacceptable lengths of bare wire.

Other objects, advantages and novel features of the invention will become apparent upon consideration of the following detailed description in conjunction with the accompanying drawing, wherein.

Figure 1:
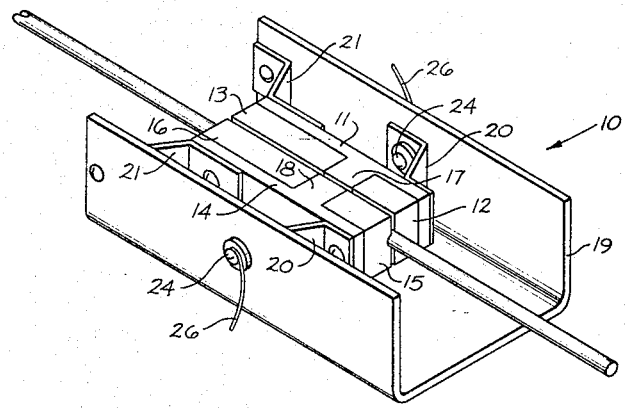
FIG. 1 is a perspective view of a device embodying the principal features of the invention.
Figure 2:
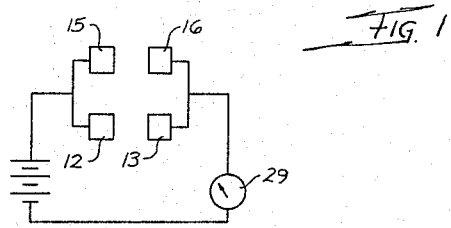
FIG. 2 is an electrical schematic illustrating the operation of the invention.

A bare wire detector is indicated generally by the numeral 10. Insulating block 11 spaces and insulates the conductive blocks 12 and 13 from each other and insulating block 14 spaces and insulates the conductive blocks 15 and 16 from each other. The insulating blocks may be made from any suitable insulating material, such as phenol fiber, and the conductive blocks may be made from any suitable conductive material, such as stainless steel.

Each of the insulating blocks 11 and 14 is provided with a segment 17 and 18, respectively, which spaces the conductive blocks a predetermined distance apart. A housing 19 is provided and the blocks 12 and 15 and blocks 13 and 16 are respectively suspended from the housing 19 by brackets 20 and 21. Screws 22 retain the conductive blocks 12 and 15 in their assembled position relative to the insulating blocks 11 and 14 and retain the assembled blocks to the brackets 20. Screws 23 retain the conductive blocks 13 and 16 in their assembled position relative to insulating blocks 11 and 14 and retain the assembled blocks to the brackets 21. Screws 24 retain the brackets 20 to the housing 19 and brackets 21 are rivited to the housing 19.

Washers 25 insulate the screws 24 and brackets 20 from the housing 19. A D.C. voltage of approximately 1,000 volts is impressed on the conductive blocks 12 and 15 through electrical leads 26. Screws 22, brackets 20 and screws 24 form the electrical path from the electrical leads 26 to the conductive blocks 12 and 15. The conductive blocks 13 and 16 are grounded to the housing 19 by screws 22 and brackets 21.

Conductive blocks 13 and 16 are tapered to receive an insulated wire 27, and the blocks 12, 13, 15 and 16 are grooved to facilitate passage of the insulated wire 27 therethrough. The insulated blocks 17 and 18 prohibit the flow of current through the circuit of FIG. 3; and so long as the insulated wire 27 has no bare portions, current will not be conducted from blocks 12 and 15 to blocks 13 and 16.

Figure 3:
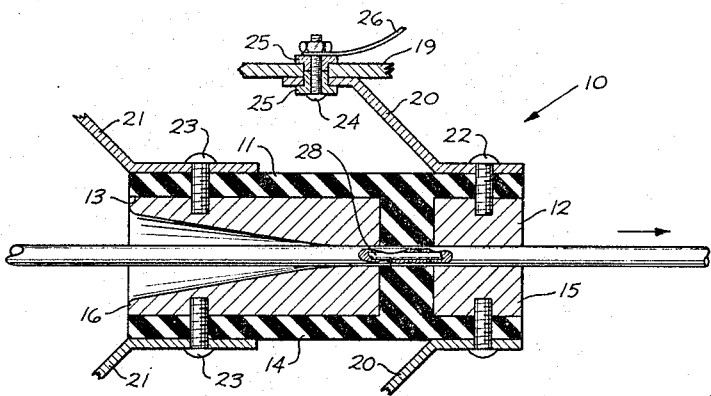
FIG. 3 is a sectional view of FIG. 1 taken along the lines 2—2.

However, should the insulated wire have any bare spots which have a length equal to or longer than the spacing of the blocks 12, 13, 15 and 16, the insulating segments 17 and 18 of the insulating blocks 11 and 14 will be bridged by the exposed segment of wire 28 and current will flow through the circuit of FIG. 3. Any conventional indicator 29, such as an ammeter, can be used to detect such current flow. Thus, the presence of bare wire is readily detected by advancing an insulated wire through the bare wire detector 10.

It is not necessary that the bare wire actually contacts the conductive zones although the wire detector will also work properly if this occurs. Preferably, a high enough D.C. voltage is used which will jump any air gap between the conductive zones and the wire due to the insulation on the wire spacing the wire from the conductive zones. It has been found that this voltage should not be below 800 volts. Below 800 volts changes in atmospheric conditions affect the reliability of the detector.

It has been found that where the wire is insulated with polyvinyl chloride and the conductive blocks are spaced ¼ inch apart by phenol fiber insulator, the voltage between the conductive zones can be as high as 10,000 volts without breaking down the dielectric strength of the insulator. Applicant has obtained satisfactory results using a voltage of approximately 1,000 volts and a wire speed of approximately 4,000 feet per minute.

It is to be understood that the above-described arrangements are simply illustrative of the application of the principles of this invention. Numerous other arrangements may be readily devised by those skilled in the art which will embody the principles of the invention and fall within the spirit and scope thereof.

For example, the conductive blocks 12 and 15 may be constructed as a unitary piece and the conductive blocks 13 and 16 may also be constructed as a unitary piece. The conductive blocks are only shown separate for convenience of construction and assembly. Also, any type of inductor 29 may be used, such as a light or bell, or the current flow may be utilized to actuate a member device or to shut down the line, without departing from the spirit of the invention.

What is claimed is:

A device for detecting those segments of an insulated conductor which are bare of insulation for at least a predetermined length, which comprises:

a conductive housing, means for maintaining the housing at ground potential, means for advancing successive sections of an insulated conductor to be tested longitudinally through the device, a first pair of conductive blocks having contiguous grooved surfaces positioned in spaced relationship on opposite sides of the path of travel of the successive sections of the insulated conductor under test, the grooved surfaces cooperating with each other to form a passage through which the conductor is passed, a second pair of conductive blocks having contiguous grooved surfaces positioned in spaced relationship on opposite sides of the path of travel of the successive sections of the insulated conductor under test, the grooved surfaces cooperating with each other to form a passage having a tapered entrance end through which the conductor under test is passed, a pair of insulating blocks supporting the conductive blocks in spaced relationship, the insulating blocks having depending portions projecting horizontally from the adjacent surfaces thereof toward each other for normally insulating the adjacent ends of the first pair of conductive blocks from the second pair of conductive blocks, an electrically conductive bracket secured at one end thereof to each of the conductive blocks and at the opposite ends of the brackets to the housing, means for insualting the brackets secured to the second pair of conductive blocks from the housing, means for impressing a D.C. voltage of a predetermined magnitude to the electrically conductive brackets connected to the first pair of conductive blocks which are maintained at substantially the same electrical potential so that a current will flow between the two pairs of conductive blocks through the conductor when a segment of the insulated conductor, at least as long as the spacing between the two pairs of conductive blocks, is bare of insulation and is passed through the device, and means for detecting current flow between the two pairs of conductive blocks.

References Cited by the Examiner
UNITED STATES PATENTS
3,096,478    7/1963    Brown _____ 324—54

WALTER L. CARLSON, *Primary Examiner.*

G. R. STRECKER, *Assistant Examiner.*